United States Patent
Kaspar et al.

(10) Patent No.: US 6,884,860 B1
(45) Date of Patent: Apr. 26, 2005

(54) FLUOROELASTOMER COPOLYMER BASED ON TETRAFLUOROETHYLENE, CHLOROTRIFLUOROETHYLENE, HEXAFLUOROPROPYLENE AND VINYLIDENE FLUORIDE

(75) Inventors: Harald Kaspar, Burgkirchen (DE); Lisa P. Chen, St. Paul, MN (US); Klaus Hintzer, Kastl (DE); Gernot Löhr, Burgkirchen (DE); Tatsuo Fukushi, Woodbury, MN (US); Erik Vermeulen, Beveren (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/627,430

(22) Filed: Jul. 25, 2003

Related U.S. Application Data

(60) Provisional application No. 60/399,230, filed on Jul. 29, 2002.

(51) Int. Cl.$^7$ ................................................. C08F 12/20
(52) U.S. Cl. ...................... 526/249; 526/86; 525/326.3
(58) Field of Search ................. 526/249, 86; 525/326.3

(56) References Cited

U.S. PATENT DOCUMENTS

| | | | |
|---|---|---|---|
| 2,567,011 A | 9/1951 | Diesslin et al. | |
| 2,732,398 A | 1/1956 | Brice et al. | |
| 2,809,990 A | 10/1957 | Brown | |
| 3,876,654 A | 4/1975 | Pattison | |
| 4,000,356 A | 12/1976 | Weisgerber et al. | |
| 4,214,060 A | 7/1980 | Apotheker et al. | |
| 4,233,421 A | 11/1980 | Worm | |
| 4,501,869 A | 2/1985 | Tatemoto et al. | |
| 4,696,989 A | 9/1987 | Oka et al. | |
| 4,745,165 A | 5/1988 | Arcella et al. | |
| 4,801,763 A | 1/1989 | Maul et al. | |
| 4,808,760 A | 2/1989 | Dannels et al. | |
| 4,831,085 A | 5/1989 | Okabe et al. | |
| 4,912,171 A | 3/1990 | Grootaert et al. | |
| 5,086,123 A | 2/1992 | Guenthner et al. | |
| 5,262,490 A | 11/1993 | Kolb et al. | |
| 5,480,930 A | * 1/1996 | Gentle et al. ................ | 524/414 |
| 5,565,512 A | 10/1996 | Saito et al. | |
| 5,591,804 A | 1/1997 | Coggio et al. | |
| 5,656,697 A | * 8/1997 | Wlassics et al. ......... | 525/326.3 |
| 5,668,221 A | 9/1997 | Saito et al. | |
| 5,677,389 A | 10/1997 | Logothetis et al. | |
| 5,929,169 A | 7/1999 | Jing et al. | |
| 5,955,556 A | * 9/1999 | McCarthy et al. .......... | 526/249 |
| 6,310,141 B1 | 10/2001 | Chen et al. | |
| 6,514,650 B1 | * 2/2003 | Schlueter et al. ............. | 430/56 |
| 6,610,790 B1 | * 8/2003 | Hung et al. .............. | 525/326.3 |
| 2002/0111417 A1 | * 8/2002 | Kirochko et al. ........... | 524/546 |
| 2002/0132074 A1 | * 9/2002 | Gervasi et al. ............ | 428/35.7 |

FOREIGN PATENT DOCUMENTS

| | | |
|---|---|---|
| EP | 0 131 203 A1 | 1/1985 |
| EP | 0 219 065 A2 | 4/1987 |
| EP | 0 251 284 B1 | 1/1988 |
| EP | 0 379 070 B1 | 7/1990 |
| EP | 0 518 076 B1 | 12/1992 |
| EP | 0 661 304 A1 | 7/1995 |
| EP | 0 761 735 A1 | 3/1997 |
| EP | 0 769 521 A1 | 4/1997 |
| EP | 0 784 064 A1 | 7/1997 |
| EP | 0 891 995 A1 | 1/1999 |
| JP | 09 268245 A | 10/1997 |
| WO | WO 96/24622 | 8/1996 |
| WO | WO 97/17381 | 5/1997 |
| WO | WO 00/09603 | 2/2000 |
| WO | WO 02/44265 A2 | 6/2002 |

OTHER PUBLICATIONS

*Encyclopedia of Polymer science and Engineering*, 2$^{nd}$ Ed., V. 15, "Silicones", pp. 204–308, John Wiley & Sons, 1989.
*Journal of the American Chemical Society*, V. 116, (1994), pp. 4521–4522.

\* cited by examiner

*Primary Examiner*—Henry Hu
(74) *Attorney, Agent, or Firm*—Brian E. Szymanski

(57) ABSTRACT

A fluoropolymer suitable for the preparation of a fluoroelastomer. The fluoropolymer generally includes repeating units derived from the monomers tetrafluoroethylene, hexafluoropropylene, vinylidene fluoride, chlorotrifluoroethylene and optionally one or more repeating units from fluorinated monomers other than tetrafluoroethylene, hexafluoropropylene, vinylidene fluoride and chlorotrifluoroethylene.

15 Claims, No Drawings

FLUOROELASTOMER COPOLYMER BASED ON TETRAFLUOROETHYLENE, CHLOROTRIFLUOROETHYLENE, HEXAFLUOROPROPYLENE AND VINYLIDENE FLUORIDE

CROSS REFERENCE TO RELATED APPLICATION

This application claims priority to U.S. Provisional Patent Application No. 60/399,230, filed Jul. 29, 2002.

FIELD OF THE INVENTION

The present invention relates to fluoropolymers suitable for the preparation of a fluoroelastomer and in particular to a fluoropolymer that comprises repeating units derived from tetrafluoroethylene (TFE), hexafluoropropylene (HFP), vinylidene fluoride (VDF) and chlorotrifluoroethylene (CTFE). The invention further relates to a curable fluoroelastomer composition based on a TFE/HFP/VDF/CTFE copolymer and to a fuel management system including a fluoroelastomer obtained from curing the fluoroelastomer composition.

BACKGROUND OF THE INVENTION

Fluoroelastomers are elastomers prepared by curing a fluoroelastomer precursor ("gum") made from monomers containing one or more atoms of fluorine, or copolymers of such monomers with other monomers, the fluoromonomer(s) being present in the greatest amount by mass. The fluoroelastomer precursor is a fluoropolymer that is suitable to prepare a fluoroelastomer having desired elasticity properties. Typically, the fluoroelastomer precursor is an amorphous fluoropolymer or a fluoropolymer that hardly shows a melting point. Fluoroelastomers have been used successfully in a number of applications due to their ability to withstand high temperatures and aggressive chemicals, as well as the ability of the fluoroelastomer gum to be processed using standard elastomer processing equipment. In addition, fluoroelastomers have been used in fuel management systems such as automotive fuel hoses, filler neck hoses, injector o-rings, and the like. Fuel management applications require low fuel vapor permeation in combination with good low temperature properties, sealability, and flexural properties.

Fluoroelastomers with high fluorine content show good fuel permeation resistance. However, high-fluorine content fluoroelastomers such as high-fluorine content terpolymers based on tetrafluoroethylene, vinylidene fluoride, and hexafluoropropylene have some limitations. For example, when the tetrafluoroethylene content (and thus the fluorine content) is high, flexibility and processability tend to be compromised. With respect to processability, the high fluorine content may render a fluoroelastomer too stiff for curative incorporation on standard processing equipment such as roll mills or Banbury mixers, which requires a material with a melting point less than about 100° C. On the other hand, when the hexafluoropropylene content, at the expense of vinylidene fluoride, is too high, the polymerization rate may become unacceptably slow for commercial production.

To overcome some of the limitations associated with the use of TFE/HFP/VDF copolymers (also known as THV copolymers), U.S. Pat. No. 6,310,141 teaches blending the THV fluoroelastomer precursor with a fluoroplastic.

U.S. Pat. No. 4,696,989 also discloses THV copolymers for producing fluoroelaslomers. In particular, this patent teaches specific ratios of the composing monomers in the ternary diagram as yielding fluoroeiastomers that are particularly suitable for use in wire coating where good insulating performance, moldability, heat resistance, flame retardance and flexibility are desired. U.S. Pat. No. 4,696,989 is not specifically concerned with providing fluoroelastomers that have excellent properties for use in fuel management systems.

Despite the many known nuoroelastomers, and in particular THV fluoroelastomers, there continues to be a desire to find further THV based fluoroelastomer compositions that have excellent properties for use in fuel management systems. In particular, it is a desire to find THV based fluoroelastomers that can be manufactured in a convenient and cost effective way, that have good processing properties, good flexibility and that have properties that make them particularly suitable for use in a fuel management system. Thus, it will typically be desired that the THV fluoroelastomers have low gas and fuel vapor permeation.

SUMMARY OF THE INVENTION

The present invention provides a fluoropolymer suitable for the preparation of a fluoroelastomer. The fluoropolymer comprises:

a. 10 to 50 mole % of repeating units derived from tetrafluoroethylene;

b. 15 to 40 mole % of repeating units derived from hexafluoropropylene;

c. 25 to 59 mole % of repeating units derived from vinylidene fluoride;

d. 1 to 20 mole % of repeating units derived from chlorotrifluoroethylene; and optionally e. one or more repeating units derived from fluorinated monomers other than tetrafluoroethylene, hexafluoropropylene, vinylidene fluoride and chlorotrifluoroethylene.

The total amount of repeating units a to e typically total to 100%.

It was found that the above identified fluoropolymer can be produced at high polymerization rates, in particular at higher rates than corresponding THV copolymers that do not include units derived from CTFE. Additionally, by including units deriving from CTFE, a fluoropolymer can be prepared that has a high fluorine content while maintaining a high flexibility and good sealability when cured to a fluoroelastomer. Moreover, the fluoroelastomers prepared therefrom have excellent gas and vapor permeation properties so as to make them particularly suitable for use in a fuel management system. By the latter term is meant any system or component of a system that may be used in the handling of fuel and includes for example fuel hoses, fuel tanks, filler neck hoses, liners and the like.

It was furthermore found that the presence of CTFE in the copolymer improves the bonding properties of the fluoropolymer to other substrates including elastomeric layers such as silicone rubbers when bonded to these substrates in the presence of an organic compound having one or more hydride functions MH wherein M is selected from the group consisting of Si, Ge, Sn and Pb. This organic compound can be present in the fluoropolymer composition from which the fluoroelastomer is prepared or can be present in a layer of the substrate. The improved bonding properties are of particular interest in fuel management systems where it may be required to bond the fluoroelastomer to other non-fluorinated components of the fuel management system.

In a further aspect, the invention provides a curable fluoroelastomer composition comprising the above-defined fluoropolymer and a cure composition.

In a still further aspect, the invention provides a fuel management system that comprises a fluoroelastomer obtained by curing a curable fluoroelastomer composition having the fluoropolymer and a cure composition. The fluoroelastomer of the fuel management system may comprise a coating as well as a shaped article.

In yet another aspect, the invention provides a method of making a fluoropolymer as described above, comprising an aqueous emulsion polymerization of tetrafluoroethylene, hexafluoropropylene, vinylidene fluoride, chlorotrifluoroethylene and optional further fluorinated monomers in an amounts appropriate so as to obtain the fluoropolymer having the composition as described above.

DETAILED DESCRIPTION

The fluoropolymer suitable for preparing the fluoroelastomer comprises repeating units of TFE, HFP, VDF and CTFE in the amounts recited above in the summary of the invention. Preferred amounts of the repeating units deriving from TFE are from 15 to 45 mole %, preferred amounts of the repeating units deriving from HFP are from 20 to 35 mole %, preferred amounts of repeating units deriving from VDF are from 28 to 58 mole % and preferred amounts of repeating units deriving from CTFE are from 2 to 15 mole %. In addition to these units, the fluoropolymer may comprise repeating units deriving from other fluorinated monomers. A particularly preferred fluorinated co-monomer for including in the fluoropolymer is a fluorinated vinyl ether and in particular a perfluorinated vinyl ether. The amount of repeating units deriving from the (per)fluorinated vinyl ether, when present, may be up to 25 mole %, preferably up to 18 mole %, more preferably up to 15 mole %.

Examples of perfluorovinyl ethers that can be used in the invention include those that correspond to the formula:

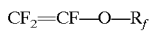

$$CF_2=CF-O-R_f$$

wherein $R_f$ represents a perfluorinated aliphatic group that may contain one or more oxygen atoms.

Particularly preferred perfluorinated vinyl ethers correspond to the formula:

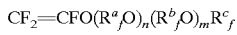

$$CF_2=CFO(R^a_fO)_n(R^b_fO)_mR^c_f$$

wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoroalkyl group of 1–6 carbon atoms. Specific examples of pertluorinated vinyl ethers include perfluoro (methyl vinyl)ether (PMVE), perfluoro (ethyl vinyl)ether (PEVE), perfluoro (n-propyl vinyl)ether (PPVE-1), perfluoro-2-propoxypropylvinyl ether (PPVE-2), perfluoro-3-methoxy-n-propylvinyl ether, perfluoro-2-methoxyethylvinyl ether and $CF_3-(CF_2)_2-O-CF(CF_3)-CF_2-O-CF(CF_3)-CF_2-O-CF=CF_2$.

Suitable perfluoroalkyl vinyl monomers correspond to the general formula:

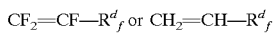

$$CF_2=CF-R^d_f \text{ or } CH_2=CH-R^d_f$$

wherein $R^d_f$ represents a perfluoroalkyl group of 1 to 10, preferably 1 to 5 carbon atoms. A typical example of a perfluoroalkyl vinyl monomer is hexafluoropropylene.

The fluoropolymer for preparing the fluoroelastomer may have a bi-modal or multi-modal molecular weight distribution to enhance the processing properties of the fluoropolymer. Generally, the fluoropolymer will have a weight average molecular weight between 10,000 to 500,000 g/mol.

The fluoropolymer suitable for curing to a fluoroelastomer is typically prepared by a free radical polymerization. The free radical polymerization is generally initiated through the use of free radical generating initiators. As initiators, one can use any of the known initiators commonly employed in the polymerization of fluorinated olefins such as tetrafluoroethylene. For example peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate, a combination of peroxodisulphate and hydrazine or azodicarboxamide (including salts thereof, preferably alkali or ammonium salts). Further initiators that can be used are ammonium-alkali- or earth alkali salts of permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization. Preferred initiator systems include peroxodisulphate and permanganate.

The free radical polymerization may be carried out in an organic solvent, can be a aqueous suspension polymerization or an aqueous emulsion polymerization. An aqueous emulsion polymerization is preferred in the present invention.

In the aqueous emulsion polymerization, the fluorinated monomers are polymerized in the aqueous phase generally in the presence of a free radical initiator and a fluorinated surfactant or emulsifier, preferably a non-telogenic emulsifier. The emulsifier will generally be used in amounts less than 1% by weight, for example from 0.1 to 1% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. Specific examples include perfluorooctanoic acid ammonium salt (APFO, described in U.S. Pat. No. 2,567,011) $C_8\mu l_7SO_3Li$ which is commercially available from Bayer AG, $C_4F_9SO_3L_1$ and $C_4F_9SO_3K$ (described in U.S. Pat. No. 2,732,398). A further example of a perfluoroalkyl containing carboxylic acid salt is $C_8\mu l_7SO_2N(C_2H_5)CH_2COOK$ (described in U.S. Pat. No. 2,809,990). Still further emulsifiers that can be used include perfluoropolyethercarboxylate emulsifiers such as disclosed in EP 219065. However, APFO is the preferred emulsifier as it can be more readily removed from the polymerization product at the end of polymerization. The aqueous emulsion polymerization may also be carried out without addition of a fluorinated emulsifier. Such a polymerization is for example described in WO 96/24622 and WO 97/17381.

In a preferred embodiment of the present invention to carry out the aqueous emulsion polymerization, an aerosol of a liquid fluorinated monomer or a liquid fluorinated, preferably perfluorinated, hydrocarbon compound is provided, steam heated and fed into the polymerization vessel. The advantage of this embodiment is that the incorporation of CTFE into the fluoropolymer is improved, which is particularly desirable when no fluorinated emulsifier or surfactant is added in the polymerization system. It will be appreciated by one skilled in the art that this finding is not particularly limited to the nature of the fluoropolymer and therefore can also be used to improve incorporation of CTFE in other fluoropolymers than those that are subject of this invention. By the term 'liquid' is meant that the respective components are liquid at ambient temperature (20° C.) and pressure (1 atm). Examples of suitable liquid fluorinated monomers for use with this embodiment are liquid (per)fluorinated vinyl ethers, for example of the formula set forth above. Suitable fluorinated hydrocarbons include those having from 3 to 25 carbon atoms and include highly fluorinated hydrocarbons containing not more than 1 or 2 hydrogen atoms as well as perfluorinated hydrocarbons. Examples of perfluorinated hydrocarbons include perfluorinated saturated linear, branched and/or cyclic aliphatic compounds such as a pertluorinated linear, branched or cyclic alkane; a perfluorinated aromatic compound such as perfluorinated benzene, or perfluorinated tetradecahydro phenanthene. It can also be a perfluorinated alkyl amine such as a perfluorinated trialkyl amine. It can further be a perfluorinated cyclic aliphatic, such as decalin; and preferably a heterocyclic aliphatic compound containing oxygen or sulfur in the ring, such as perfluoro-2-butyl tetrahydrofuran.

Specific examples of perfluorinated hydrocarbons include perfluoro-2-butyltetrahydrofuran, perfluorodecalin, perfluoromethyldecalin, perfluoromethylcyclohexane, perfluoro(1,3-dimethylcyclohexane), perfluorodimethyldecahydronaphthalene, perfluorofluoorene, perfluoro(tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70 or FC 5312 all produced by 3M Company. An example of a useful highly fluorinated hydrocarbon compound is $C_3F_7$—[O—CF(CF$_3$)—CF$_2$]$_n$—O—CHF—CF$_3$ wherein n is from 1 to 10.

The aqueous emulsion polymerization can be carried out continuously in which, for example, monomers, water, optionally further emulsifiers, buffers and catalysts are fed continuously to a stirred reactor under optimum pressure and temperature conditions while the resulting emulsion or suspension is removed continuously. An alternative technique is batch or semibatch (semi-continuous) polymerization by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

The polymerization systems may comprise auxiliaries, such as buffers and, if desired, complex-formers or chain-transfer agents including for example alkanes such as ethane and n-pentane, dialkyl ethers such as dimethyl ether, methyl tertiary butyl ether and chlorine or bromine containing chain transfer agents. The polymerization temperature may be from 10 to 180° C., typically 30° C. to 100° C. Polymerization pressures may be from 1 to 40 bar, typically 3 to 30 bar.

According to a particular embodiment, the fluoropolymer may be prepared by initiating the free radical polymerization in the presence of a chloride salt. As a result of the presence of the chloride salt, the number of polar and in particular ionic end groups can be reduced and $CF_2Cl$ end groups are formed. This was found to enhance the processing characteristics of the fluoropolymer. Further, the $CF_2Cl$ end groups may also further improve the bonding properties of the bonding properties of the fluoroelastomer to other substrates, particularly when an organic compound having MH functions as mentioned above is present.

A curable fluoroelastomer composition according to the invention comprises the fluoropolymer and a cure composition. Such a curable fluoroelastomer composition may be cured by any of the methods known to those skilled in the art. The cure composition typically includes one or more components that cause the fluoropolymer chains to link with each other thereby forming a three dimensional network. Such components may include catalysts, curing agents and/or coagents.

In one embodiment of curing the fluoropolymer a so called peroxide cure system may be used. In a typical peroxide cure system, the fluoropolymer is provided with one or more cure sites that comprise a halogen capable of participating in a peroxide cure reaction and the composition for providing the fluoropolymer contains an organic peroxide. The halogen capable of participating in a peroxide cure reaction is typically bromine or iodine and may be distributed along the polymer chain and/or may be contained in the end groups of the fluoropolymer. Typically, the amount of bromine or iodine contained in the fluoropolymer is between 0.001 and 5%, preferably between 0.01 and 2.5%, by weight with respect to the total weight of the fluoropolymer. It has further been found that also chlorine is capable of participating in a peroxide cure reaction of the fluoropolymer if an organic compound having MH functions as described above is present. Accordingly, the fluoropolymers of this invention, which contain chlorine atoms by virtue of units deriving from CTFE can be used for curing in a peroxide cure reaction. Of course the fluoropolymer may additionally be modified with bromine and/or iodine.

In order to introduce halogens in addition to the chlorine atom of the CTFE units and which are capable of participation in the peroxide cure reaction, along the chain, the copolymerization of the basic monomers of the fluoropolymer may be carried out with a suitable fluorinated cure-site monomer (see for instance U.S. Pat. Nos. 4,745,165, 4,831,085, and 4,214,060). Such comonomer can be selected for instance from:

(a) bromo- or iodo-(per)fluoroalkyl-perfluorovinylethers having the formula:

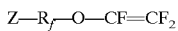
Z—R$_f$—O—CF=CF$_2$ wherein Z is Br or 1, R$_f$ is a (per)fluoroalkylene $C_1$–$C_{12}$, optionally containing chlorine and/or ether oxygen atoms; for example: $BrCF_2O$—CF=CF$_2$, $BrCF_2CF_2$—O—CF=CF$_2$, $BrCF_2CF_2CF_2$—O—CF=CF$_2$, $CF_3CFBrCF_2$—O—CF=CF$_2$, and the like;

(b) bromo- or iodo (per)fluoroolefins such as those having the formula:

$$Z'—R'_f CF=CF_2$$

$$Z'—R'_f—CH=CH_2$$

wherein Z' is Br or I, R'$_r$ is a (per)fluoroalkylene $C_1$–$C_{12}$, optionally containing chlorine atoms; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1 and 4-iodo-3,3,4,4-tetrafluorobutene-1;

(c) non-fluorinated bromo-olefins such as vinyl bromide and 4-bromo-1-butene.

In replacement of or in addition to the cure site comonomer, the fluoropolymer can contain a cure site component in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_nSO_2Na$ with n=1 to 10 (where X is Br or I) or an initiator composition comprising ammonium persulfate and potassium bromide and/or potassium iodide. The chlorine of the $CF_2Cl$ end groups introduced when chloride salt is present in the initiation of the free radical polymerization, can also participate in a peroxide cure reaction.

Examples of chain transfer agents include those having the formula $R_fBr_x$, wherein $R_f$ is a x-valent (per)fluoroalkyl radical $C_1$–$C_{12}$, optionally containing chlorine atoms, while x is 1 or 2. Examples include $CF_2Br_2$, $Br(CF_2)_2Br$, $Br(CF_2)_4Br$, $CF_2ClBr$, $CF_3CFBrCF_2Br$ and the like. Further examples of suitable chain transfer agents include $CH_2Br_2$, $CH_2I_2$ and those disclosed in U.S. Pat. No. 4,000,356.

Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di (tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of fluoropolymer is used.

The cure site component may also comprise a nitrile group-containing cure site monomer. Preferred useful nitrile group-containing cure site monomers include nitrile-containing fluorinated olefins and nitrile-containing fluorinated vinyl ethers, such as depicted below:

$$CF_2=CF—CF_2—O—R_f—CN$$

$$CF_2=CFO(CF_2)_lCN$$

$$CF_2=CFO[CF_2CF(CF_3)O]_g(CF_2)_vOCF(CF_3)CN$$

$$CF_2=CF[OCF_2CF(CF_3)]_kO(CF_2)_uCN$$

where, in reference to the above formulas: l=2–12; g=0–4; k=1–2; v=0–6; and u=1–4, $R_f$ is a perfluoroalkylene or a bivalent perfluoroether group. Representative examples of such a monomer include perfluoro(8-cyano-5-methyl-3,6-dioxa 1-octene), $CF_2=CFO(CF_2)_5CN$, and $CF_2=CFO(CF_2)_3OCF(CF_3)CN$.

When the fluoropolymer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, hexamethylene tetramine (urotropin), dicyan diamid, and metal-containing compounds of the formula:

$$A^{w+}(NH_3)_vY^{w-}$$

where $A^{w+}$ is a metal cation such as $Cu^{2+}$, $Co^{2+}$, $Co^+$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

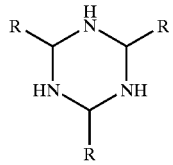

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The fluoropolymers including a nitrile containing cure site component can also be cured using one or more peroxide curatives along with the ammonia generating catalysts. Suitable peroxide curatives for this purpose include those listed above. It will further be understood by one skilled in the art that the curable fluoroelastomer composition may include a mixture of cure site components, such as a mixture of nitrile containing cure sites and cure sites including a halogen capable of participating in a peroxide cure reaction. In the latter case, a mixture of ammonia generating compounds and peroxides will generally be employed.

To cure the nitrile containing fluoropolymers all other well-known compounds can be used, like amino phenols (U.S. Pat. No. 5,677,389), ammonia salts (U.S. Pat. No. 5,565,512), amidoxines (U.S. Pat. No. 5,668,221) and other ammonia generating comp (PCT 00/09603) or imidates.

Another component which is usually included in a cure composition based on an organic peroxide and/or nitrile containing cure site component, is a coagent composed of a polyunsaturated compound, which is capable of cooperating with the peroxide to provide a useful cure. These coagents can be added in an amount equal to 0.1 and 10 parts per hundred parts fluoropolymer, preferably between 2–5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

According to a further embodiment, curing of the fluoropolymer may be effected using a polyhydroxy compound and the cure composition will thus comprise a polyhydroxy compound. The advantage of using a polyhydroxy compound for curing the fluoropolymer is that it will not be necessary to include special cure site components in the fluoropolymer. In addition to the polyhydroxy compound, a polyhydroxy curing system generally also comprises one or more organo-onium accelerators in addition to the polyhydroxy compound. The organo-onium compounds useful in the present invention typically contain at least one heteroatom, i.e., a non-carbon atom such as N, P, S, O, bonded to organic or inorganic moieties and include for example ammonium salts, phosphonium salts and iminium salts. One class of quaternary organo-onium compounds useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo [5,4,0]-7-undecenium chloride
benzyl tris(dimethylamino)phosphonium chloride
benzyl(diethylamino)diphenylphosphonium chloride.

Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoropolymers, such as those polyhydroxy compounds disclosed in U.S. Pat. No. 3,876,654 (Pattison), and U.S. Pat. No. 4,233,421 (Worm). One of the most useful and commonly employed aromatic polyphenols is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

The cure composition based on polyhydroxy compounds may further include an acid acceptor. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoropolymer.

In a further embodiment of the invention, the cure composition may comprise an organic peroxide and a polyhydroxy based cure system as described above. Such cure composition can be used with a fluoropolymer that has a halogen capable of participating in a peroxide cure reaction as well as with fluoropolymers that do not contain such halogens. If the fluoropolymer has halogens capable of participating in the peroxide cure reaction, a cure composition having a polyhydroxy compound and a peroxide can provide for a so called dual cure. The use of an organic peroxide in the cure composition is particularly beneficial if the fluoropolymer is to form a fluoroelastomer layer bonded to another elastomer that is also formed with the use of a peroxide cure system such as for example in case of a silicone based elastomer.

The curable fluoroelastomer composition may contain further additives, such as carbon black, stabilizers, plasticizers, lubricants, fillers, and processing aids typically utilized in fluoropolymer compounding can be incorporated into the compositions of the present invention, provided they have adequate stability for the intended service conditions.

The curable fluoroelastomer compositions may be prepared by mixing the fluoropolymer, the cure composition and optionally the organic compound having hydride function(s) and other additives in conventional rubber processing equipment. Such equipment includes rubber mills, internal mixers, such as Banbury mixers, and mixing extruders.

As mentioned above, the fluoropolymer has improved bonding properties to other substrates, particularly in the presence of an organic compound having hydride functions MH. Additionally, by including this compound in the fluoropolymer composition, a peroxide curable fluoropolymer composition can be obtained. Examples of the organic compound include siloxanes or silazenes that comprise one or more MH functions. Typically, when the organic compound is a siloxane or a silazene, the MH functions will be —SiH functions. Preferably, the SiH function will be an —OSiH or a —NSiH whereby the hydrogen is attached to a silicon atom that is further bonded to an oxygen or nitrogen atom. The siloxane or silazene may be a simple low molecular weight organic compound or may be a polymeric compound including for example a polysiloxane which may be linear, branched or cyclic. Specific examples include HSi$(OCH_2CH_3)_3$, $(CH_3)_2(CH_3CH_2O)$SiH, 1,1,3,3 tetraisopropyl disiloxane, diphenyl-1,1,3,3-tetrakis(dimethylsiloxy) disiloxane available from United Chem, silylhydride terminated poly(dimethylsiloxane), poly(methyl hydro siloxane) and copolymers of dimethylsiloxane and methylhydrosiloxane, 1,3,5-trimethyl cyclosiloxane and 1-phenyl-3,3,5,5-tetramethyl cyclosiloxane. Polysiloxanes and siloxanes having SiH groups are known in the art and can be produced according to well-known procedures such as disclosed in for example: Encyclopedia of Polymer Science and Engineering, Second Edition, V15, Silicones, pgs. 204–308, John Wiley & Sons, 1989. Siloxanes having SiH groups are also generally commercially available. Preferably, the siloxane or polysiloxane will have a molecular weight between 150 g/mol and 10 000 g/mol.

The organic compound may also be a compound that corresponds to the formula:

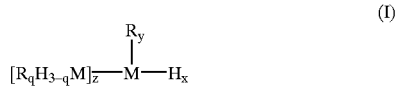

(I)

wherein R represents a hydrocarbon group optionally comprising one or more substituents and wherein the R groups may be the same or different and whereby two R groups may be linked to each other so as to form a ring, M is selected from Si, Ge, Sn and Pb, q is a value of 1 to 3, x is a value of 1 to 3, y and z represent a value of 0 to 3 and the sum of y+z=4-x. Examples of substituents that may be present on the hydrocarbon group R include alkoxy, aryloxy, halogens such as chlorine and bromine, nitric groups, hydroxy groups and amino groups. The backbone of the hydrocarbon group may further be interrupted by one or more heteroatoms such as for example oxygen and nitrogen atoms. Typical examples of hydrocarbon groups include saturated or unsaturated linear, branched or cyclic aliphatic groups and aromatic groups. Specific examples are $C_1$–$C_5$ alkyl groups, aryl groups having 6 to 12 carbon atoms, arylalkyl and alkylaryl groups having 7 to 14 carbon atoms. Compounds of formula (I) above are known and have been described in for example J. Am. Chem. Soc., 116 (1994), page 45214522. Examples include tri(n-butyl)tin hydride, tris(ethyl)silyl hydride, bis(trimethylsilyl)siylmethyl hydride, tris (trimethylsilyl)silyl hydride, tris(phenyl)silyl hydride. Compounds of formula (1) have further been disclosed in EP 761 735.

The invention is further illustrated with reference to the following examples, without however the intention to limit the invention thereto. All parts are by weight unless indicated otherwise.

EXAMPLES

Test Methods:

The melt flow index (MFI) was carried out according to DIN 53735, ISO 12086 or ASTM D-1238 at a support weight of 5.0 kg and a temperature of 265° C. or 297° C. alternatively. The MFI was obtained with a standardized extrusion die of 2.1 mm diameter and a length of 8.0 mm.

A strain controlled ARES rheometer of Rheometry Scientific was used to evaluate the processability of the fluoropolymer in frequency sweep experiments. The viscosity data were determined at various shear rates at 265° C. in nitrogen atmosphere using a 25 mm parallel plate geometry and typically 10% strain.

Unless otherwise noted, 76×152×2 mm press cured sheets were prepared for physical property testing by pressing at 5 to 7 MPa at 163° C. for 50 minutes. From these press cured sheets, the Tensile Strength at Break and the Elongation at Break were measured according to ASTM D 412. Hardness was determined according to ASTM D2240 Method A. Shore A durometer was used.

Melting peaks of the fluororesins were determined according to ASTM 4591 by means of Perkin-Elmer DSC 7.0 under nitrogen flow and a heating rate of 10° C./min. The indicated melting points relate to the melting peak maximum.

Molecular weight distributions were determined by means of Size Exclusion Chromatography (SEC) recorded at 35° C. in tetrahydrofuran-UV grade. The SEC equipment consisted of a Waters 510 isocratic pump, a Perkin Elmer ISS-100 autosampler, a Waters column oven, three gel mixed bed type B columns (10 μm) from Polymer Laboratories (300 mm×7.5 mm), and a Waters 410 RI detector. The instrument was calibrated using 10 narrow distributed polystyrene standard samples (PSS, Mainz/Germany) ranging from 1280 g/mol to 7,300,000 g/mol. The SEC-elugrams calibrated to polystyrene were converted to the molecular weight distribution with the universal calibration procedure using the Mark-Houwink coefficients α =0.751 and K=0.045396 ml/g.

The latex particle size determination was conducted by means of dynamic light scattering with a Malvern Zetazizer 1000 HSA in accordance to ISO/DIS 13321. The reported average particle size is the Z-average. Prior to the measurements, the polymer latexes as yielded from the polymerizations were diluted with 0.001 mol/L KCl-solution, the measurement temperature was 20° C. in all cases.

For the evaluation of the vapor transmission (permeation rate) in accordance to ASTM D814, a mixture of 42.5% toluene, 42.5% isooctane and 15% methanol by volume was used as test fluid. Sheets of 0.75–0.90 mm thickness of each polymer composition were press-cured. 3 inch diameter samples were die cut from each sheet. Vapor transmission cups, each with a 2.5 inch opening (4.909 in$^2$ exposed sample surface) and approximately 160 ml capacity, were used and are available from Thwing-Albert Instrument Co. High fluorine, low durometer fluoroelastomer gaskets insured a good seal between sample and the test fluid. The cups were assembled by placing 100 ml of fluid in the cup, a 0.5 mm gasket between the cup and the sample, and a 1.5 mm gasket between the sample and the clamping ring. Because the samples were extensible during testing, a 16-mesh circular screen was placed between the upper gasket and the clamping ring. All tests were conducted at 40° C. for 32 days with the cup maintained in the upright position. The first 7 days of testing, no data were collected in order to allow the sample to reach vapor transmission equilibrium. Then the cups were weighted approximately every other day. The transmission rate was then multiplied by the thickness of the samples in millimeters to normalize each value.

Example 1: (Comparative Example)

A polymerization vessel with a total volume of 186.1 l equipped with an impeller agitator system was charged with 114.6 l deionized water 950 g of a 30 weight % aqueous solution of perfluorooctanoate ammonium salt (FX 1006 of 3M Company, APFO). In three following cycles, the vessel was degassed and subsequently charged with nitrogen to assure that all oxygen had been removed. The vessel was then heated up to 71° C. and the agitation system was set to 210 rpm. The vessel was charged with ethane to a pressure of 0.6 bar absolute, with HFP to 13.4 bar absolute, with VDF to 14.1 bar absolute and with TFE to 15.5 bar absolute reaction pressure. The polymerization was initiated by 983 g 30% APS solution (ammonium peroxodisulfate). As the reaction started, the reaction pressure of 15.5 bar absolute was maintained by the feeding TFE, HFP and VDF into the gas phase with a feeding ratio HFP (kg)/TFE (kg) of 1.011 and VDF (kg)/TFE (kg) of 0.528. The reaction temperature of 71 DC was also maintained. After 4 h and 25 min the feeding of 22 kg TFE was completed and the monomer valves were closed. The reactor was vented and flushed with N$_2$ in three cycles.

The so obtained 171 kg polymer dispersion had a solid content of 32%. The latex particle diameter was 141 nm as measured by dynamic light scattering. The composition of the resulting fluoropolymer was 40 mol % TFE, 27% mol % HFP, 33 mol % VDF. The fluorine content of the fluoropolymer was 72.5 wt %.

1000 ml of this polymer dispersion w coagulated by adding it drop-wise to an aqueous $MgCl_2$ solution with agitation, after which it was de-watered and washed three times with deionized water (60–70° C.). The polymer was dried overnight at 130° C. in an air circulating. The polymer shows a slight melting transition at 67° C. and a heat of fusion of 0.7 J/g. The polymer has a MFI(26515) of 105 g/10 min.

Example 2

A polymer according to the invention was prepared under the similar conditions as for the comparative fluoropolymer of Example 1. The reaction vessel of Example 1 was pressured up with ethane to a pressure of 0.8 bar absolute, with CTFE to 1.2 bar absolute, with HFP to 11.2 bar absolute, with VDF to 13.1 bar absolute and with TFE to 15.5 bar absolute reaction pressure. The polymerization was initiated by 983 g 30% APS solution. After the reaction has rapidly started, the reaction temperature of 71° C. was maintained by cooling the reactor jacket and the reaction pressure of 15.5 bar absolute was maintained by the feeding TFE, CTFE, HFP and VDF into the gas phase with a feeding ratio CTFE (kg)/TFE (kg) of 0.209, HFP (kg)/TFE (kg) of 0.846 and VDF (kg)/TFE (kg) of 0.482. After 3 h and 05 min the feeding of 21 kg TFE was completed and the monomer valves were closed. The reactor was vented and flushed with $N_2$ in three cycles.

The so obtained 169 kg polymer dispersion had a solid content of 31%. The latex particle diameter was 146 nm according to dynamic light scattering. The fluoropolymer had the following composition 7.2 mol % CTFE, 22.6 mol % 30.2 mol % VDF and 40 mole % TFE. The fluorine content was 72.4 wt % and the total halogen content was 73.1 wt %. The polymer workup was conducted analogous to Example 1, the polymer showed a very slight melting transition at 49° C. and a heat of fusion of 03 $\mu$g. The polymer had a MFI(265/5) of 189 g/10 min. The mass average molecular weight is $M_w$=49,700 g/mol according to size exclusion chromatography, the molecular weight distribution appears symmetrical with a polydispersity of $M_w/M_n$=1.6.

This example shows that HFP can be partially substituted by CTFE while maintaining the very low degree of crystallinity comparable to the fluoropolymer of example 1. Additionally, by including CTFE the reaction rate increased.

Example 3

A fluoropolymer according to the invention was prepared in the same reaction vessel and under the similar conditions as for Example 1 & 2 with the exception that no APFO was used. The vessel was charged with 235 g of PPVE-2 (fed as steam heated aerosol) to a pressure of 0.62 bar absolute, with 204 g CTFE to 1.17 bar absolute, with 4760 g HFP to 10.87 bar absolute, with 456 g VDF to 12.97 bar absolute and with 890 g TFE to 15.50 bar absolute reaction pressure. The polymerization was initiated by the addition of 980 g 300/% aqueous ammonium-peroxodisulfate (APS) solution. As the reaction starts, the reaction pressure of 15.5 bar absolute is maintained by the feeding TFE, HFP, CFTE and VDF into the gas phase with a feeding ratio CTFE (kg)/TFE (kg) of 0.209, HFP (kg)/TFE (kg) of 0.846 and VDF (kg)/TFE (kg) of 0.482. During the polymerization, PPVE-2 is additionally fed as heated aerosol with a feeding a feeding rate 50 g/h. The reaction temperature of 71° C. is also maintained. After feeding 10.5 (kg) TFE, a liquid dispersion sample was taken from the reactor and 85 g of ethane chain transfer agent is charged into the vessel which results in a substantial decrease of the polymerization rate. The polymerization is continued until the feeding of 21.0 kg TFE is completed after 4 h and 35 min total polymerization time. After the monomer valves are closed, the monomer gas phase is reacted down to a vessel pressure of 11.6 bar within 15 min. The reactor is vented and flushed with $N_2$ in three cycles.

The so obtained 168 kg polymer dispersion had a solid content of 31%, the following polymer workup was conducted analogous to Example 1. The fluoropolymer had the following composition: 7.2 mol % CTFE, 39.9 mol % TFE, 30.2 mol % VDF, 22.6 mol % HFP and 0.1 mol % PPVE-2. The fluorine content was 72.2 wt % and the total halogen content was 73.1 wt %. The polymer shows a slight melting transition at 88° C. and a heat of fusion of 0.8 J/g. The polymer has a MFI(265/5) of 188 g/10 min. The mass average molecular weight is $M_w$=50,500 g/mol according to size exclusion chromatography, the molecular weight distribution appears asymmetrical with a high molecular weight tailing and a polydisperity of $M_w/M_n$=3.1. The dispersion sample that was taken at 10.5 kg TFE feed was worked up under equivalent conditions, this sample had a MFI of 18.8 g/10 min.

This material was evaluated in terms of the processing behavior and compared to the unimodal material of Example 2. The processing evaluation data are summarized in Table 1.

TABLE 1

| Processing Evaluation (ARES), 265° C. | Example 2 | Example 3 |
| --- | --- | --- |
| eta*(1/s) [Pa*s] | 256 | 270 |
| eta*(10/s) [Pa*s] | 256 | 258 |
| eta*(100/s) [Pa*s] | 220 | 180 |
| eta*(500/s) [Pa*s] | 155 | 101 |

Example 4

As described in the following, the polymers of Example 1 to 3 were press-cured using a bisphenol cure composition and various physical properties were measured. In each case, 100 parts of the polymer were mixed on a two roll mill with the following ingredients: (mmhr below means milimole per hundred parts by weight of the fluoropolymer)

5.94 (mmhr) Bisphenol AF 0.54 (mmhr) of the following phosphonium complex $(C_4H_9)_3P^+CH_2CH(CH_3)OCH_3\ ^-OC_6H_4$ $C(CF_3)_2C_6H_4OH$ which is tributylmethoxy propyl phosphonium chloride prepared from tributyl phosphene (available from Cytec) allylchloride and methanol and then reacting with the sodium salt of Bisphenol AF.

1.03 (mmhr) of a further complex which is a complex prepared by reacting tributylmethoxy propyl phosphonium chloride with the sodium salt of perfluoroctyl-n-methylsulfonamide.

The following other compounding ingredients were also added: 3 g per hundred gram (phr) fluoropolymer magnesium oxide (Elastomag 170 from Morton International) and 6 phr calcium hydroxide and 20 phr carbon black (N762). The composition was prepared in the form of individual sheets measuring 76×152×2 mm by pressing at 5–7 MPa at 165° C. for 50 min.

Finally, all three cured compounds were tested and compared for various properties according to the test protocols set forth above. The test results are reported in Table 2.

TABLE 2

|  | Example 1 (comparative) | Example 2 | Example 3 |
|---|---|---|---|
| MFI(265/5),raw gum [g/10 min] | 105 | 139 | 188 |
| Curing properties (MDR, 0.5°@177° C.) | | | |
| Minimun torque, ML [in/lbs] | 0.2 | 0.2 | 0.9 |
| Maximum torque, MH [in/lbs] | 8.9 | 16.4 | 11.4 |
| Ts2 [minutes] | 1.9 | 1.9 | 2.3 |
| t'50 [minutes] | 2.5 | 2.2 | 2.8 |
| t'90 [minutes] | 5.5 | 3.3 | 4.5 |
| Physical properties of press cured sheet | | | |
| Hardness (Durometer, shore A) | 85 | 82 | 87 |
| Tensile strength [psi] | 1435 | 1725 | 1630 |
| Elogation [%] | 250 | 235 | 214 |
| 100% Modulus [psi] | 975 | 800 | 1055 |
| Permeation, CM15@40° C. [g · mm/m² · d] | 12.4 | 11.8 | 12.7 |

What is claimed is:

1. Fluoropolymer suitable for the preparation of a fluoroelastomer, said fluoropolymer comprising:
   a. 10 to 50 mole % of repeating units derived from tetafluoroethylene;
   b. 15 to 40 mole % of repeating units derived from hexafluoropropylene;
   c. 25 to 59 mole % of repeating units derived from vinylidene fluoride;
   d. 1 to 20 mole % of repeating units derived from chlorotrifluoroethylene; and optionally
   e. one or more repeating units derived from fluorinated monomers other than tetrafluoroethylene, hexafluoropropylene, vinylidene fluoride and chlorotrifluoroethylene.

2. Fluoropolymer according to claim 1 wherein said optional one or more repeating units are derived from a perfluorinated vinyl ether monomer.

3. Fluoropolymer according to claim 2 wherein said optional one or more repeating units are present in a total amount of up to 25 mole %.

4. Fluoropolymer according to claim 1 wherein said fluoropolymer has a bi-modal or multi-modal molecular weight distribution.

5. Fluoropolymer according to claim 1 wherein said fluoropolymer comprises one or more cure sites capable of engaging in a peroxide cure reaction.

6. Fluoropolymer according to claim 5 wherein said cure sites comprise bromine and/or iodine atoms.

7. Curable fluoroelastomer composition comprising a fluoropolymer as defined in claim 1 and a cure composition.

8. Curable fluoroelastomer composition according to claim 7 wherein said cure composition comprises a polyhydroxy compound and an onium compound.

9. Curable fluoroelastomer composition according to claim 7 wherein said cure composition comprises an organic peroxide.

10. Curable fluoroelastomer composition according to claim 7 er comprising an organic compound comprising a hydrido function MH, wherein M is selected from Si, Ge, Sn and Pb.

11. Component of a fuel management system comprising a fluoroelastomer obtained by curing the curable fluoroelastomer composition defined in claim 7.

12. Method of making a fluoropolymer as defined in claim 1, comprising an aqueous emulsion polymerization of tetrafluoroethylene, hexafluoropropylene, vinylidene fluoride, chlorotrifluoroethylene and optional further fluorinated monomers in an amount appropriate so as to obtain a fluoropolymer having the composition as defined in claim 1.

13. Method according to claim 12 wherein said method is carried out without addition of a fluorinated surfactant.

14. Method according to claim 12 wherein an aerosol of liquid fluorinated monomer or a liquid fluorinated hydrocarbon is provided and fed with steam heating into a reaction vessel in which said aqueous emulsion polymerization is carried out.

15. Fluoroelastomer prepared from a fluoropolymer, the fluoropolymer comprising:
   a. 10 to 50 mole % of repeating units derived from tetrafluoroethylene;
   b. 15 to 40 mole % of repeating units derived from hexafluoropropylene;
   c. 25 to 59 mole % of repeating units derived from vinylidene fluoride;
   d. 1 to 20 mole % of repeating units derived from chlorotrifluroroethylene; wherein the fluoroelastomer has a lower flexural modulus then corresponding terpolymers of repeating units derived from tetrafluoroethylene, hexafluoropropylene, and vinylidene fluoride that do not contain chlorotrifluoroethylene.

* * * * *

UNITED STATES PATENT AND TRADEMARK OFFICE
CERTIFICATE OF CORRECTION

PATENT NO. : 6,884,860 B1
DATED : April 26, 2005
INVENTOR(S) : Kaspar, Harald

It is certified that error appears in the above-identified patent and that said Letters Patent is hereby corrected as shown below:

Title page,
Item [56], References Cited, FOREIGN PATENT DOCUMENTS, delete "EP    0 518 076" and insert -- EP    0 518 073 --.

Column 1,
Line 67, delete "fluoroelaslomers" and insert -- fluoroelastomers --.

Column 5,
Line 28, delete "pertluorinated" and insert -- perfluorinated --.

Column 7,
Line 66, delete "dioxa 1" and insert -- dioxa-1 --.

Column 11,
Line 26, delete "siylmethyl" and insert -- silylmethyl --.

Column 13,
Line 60, delete "CFTE" and insert -- CTFE --.

Column 14,
Line 20, delete "polydisperity" and insert -- polydispersity --.

Column 15,
Line 25, delete "a" and insert -- a. --.

Signed and Sealed this

Eleventh Day of October, 2005

JON W. DUDAS
*Director of the United States Patent and Trademark Office*

UNITED STATES PATENT AND TRADEMARK OFFICE
CERTIFICATE OF CORRECTION

PATENT NO.      : 6,884,860 B1
DATED           : April 26, 2005
INVENTOR(S)     : Kaspar, Harald It is certified that error appears in the above-identified patent and that said Letters Patent is hereby corrected as shown below:

Title page,
Item [56], References Cited, FOREIGN PATENT DOCUMENTS, delete "EP     0 518 076" and insert -- EP      0 518 073 --.

Column 1,
Line 67, delete "fluoroelaslomers" and insert -- fluoroelastomers --.

Column 2,
Line 2, "fluoroeiastomers" should be -- fluoroelastomers --.
Line 9, "nuoroelastomers" should be -- fluoroelastomers --.

Column 3,
Line 51, "pertluorinated" should be -- perfluorinated --.

Column 4,
Line 58, "$C_8u1_7SO_3Li$" should be -- $C_8F_{17}SO_3Li$ --.
Line 59, "$C_4F_9SO_3L_1$" should be -- $C_4F_9SO_3Li$ --.
Lines 61-62, "$C_8u1_7SO_2N(C_2H_5)CH_2COOK$" should be
-- $C_8F_{17}SO_2N(C_2H_5)CH_2COOK$ --.

Column 5,
Line 28, delete "pertluorinated" and insert -- perfluorinated --.

Column 7,
Line 7, "$R'_r$" should be -- $R'_f$ --.
Line 34, "$CH_{212}$" should be -- $CH_2I_2$ --.
Line 66, delete "dioxa 1" and insert -- dioxa-1 --.

Column 8,
Line 12, "$Co^+$" should be -- $Co^{3+}$ --.

Column 11,
Line 15, "nitric" should be -- nitrile --.
Line 25, "45214522" should be -- 4521-4522 --.
Line 26, delete "siylmethyl" and insert -- silylmethyl --.
Line 26, "tri(n-butyl)tin" should be -- tris(n-butyl)tin --.
Line 66, "R1" should be -- RI --.

Column 12,
Line 58, "71 DC" should be -- 71° C --.

UNITED STATES PATENT AND TRADEMARK OFFICE
CERTIFICATE OF CORRECTION

PATENT NO. : 6,884,860 B1
DATED : April 26, 2005
INVENTOR(S) : Kaspar, Harald

It is certified that error appears in the above-identified patent and that said Letters Patent is hereby corrected as shown below:

Column 13,
Line 1, "w" should be -- was --.
Line 5, after the word "circulating" insert -- oven --.
Line 7, "(26515)" should be -- (265/5) --.
Lines 31-32, "22.6 mol %" should be -- 22.6 mol % HFP, --.
Line 36, "03 $\mu$g" should be -- 0.3 J/g --.
Line 57, "300/%" should be -- 30% --.
Line 60, delete "CFTE" and insert -- CTFE --.

Column 14,
Line 20, delete "polydisperity" and insert -- polydispersity --.

Column 15,
Line 25, In Claim 1, delete "a" and insert -- a. --.
Table 2, 1$^{st}$ entry under Example 2, "139" should be -- 189 --.

Column 16,
Line 13, "er" should be -- further --.
Line 14, "hydrido" should be -- hydride --.

Signed and Sealed this

Eighteenth Day of October, 2005

JON W. DUDAS
*Director of the United States Patent and Trademark Office*